Patented July 17, 1923.

1,462,029

UNITED STATES PATENT OFFICE.

ARTHUR B. CLARK, OF ST. LOUIS, MISSOURI, ASSIGNOR TO FER-MIL-LAC PROCESS COMPANY, OF ST. LOUIS, MISSOURI, A CORPORATION OF MISSOURI.

PROCESS FOR THE FERMENTATION OF MILK.

No Drawing. Application filed November 12, 1921. Serial No. 514,565.

*To all whom it may concern:*

Be it known that I, ARTHUR B. CLARK, a citizen of the United States, residing at 3740 Lindell Boulevard, St. Louis, Missouri, have invented a certain new and useful Improvement in Processes for the Fermentation of Milk, of which the following is a specification.

My invention relates to an improvement in the process of fermenting milk by the introducing therein of a germ known as the Bulgarian bacillus. I am aware that the fermentation of milk by the use of this bacillus alone, is not new, and I am familiar with the patent of John P. Cabanne, No. 944,013, describing such a process. The process, however, which I employ is an improvement upon the process of Cabanne, producing more satisfactory and uniform results.

In my process, I use powdered milk culture containing the germ known as the Bulgarian bacillus, which I employ in the following manner: The proportions and the periods prescribed for fermentation at the different steps of the process are approximate only and may be slightly varied, and the number of successive steps employed in the fermentation may be increased without changing the character of my invention, which consists essentially in a succession of steps wherein quantities of milk fermented by means of the Bulgarian bacillus are added to successively larger quantities of milk, which, in turn, are allowed to ferment until the desired quantity of the finished product is obtained. The proportions and periods, and the successive steps, however, which I prefer to use are as follows: I take one ounce of the culture which I introduce into a quart of milk that has been pasteurized in the manner described in the Cabanne patent, and then reduced to a temperature of 90° F. The milk thus treated is kept at a temperature of 90° F. for a period of about twenty hours, until the process of fermentation develops a slight separation of the solids in the milk; at the end of that period, this quantity of fermented milk is added to three gallons of pasteurized milk at a temperature of 90° F. and the resulting mixture is maintained at this uniform temperature for a further period of about twelve hours, until the process of fermentation has again produced a slight separation of the solids in the milk. At the end of that time, the product of this second fermentation is added to one hundred gallons of pasteurized milk, still at a temperature of 90° F. and the entire mass is then kept at this temperature for a further period of twelve hours, when the process of fermentation is complete by the production of about .7% of lactic acid. The further fermentation of the product is checked by reducing its temperature to between 35° and 40° F. and maintaining it at that temperature until it has been consumed.

The advantages of this process over that heretofore in use and described in the Cabanne patent are as follows: If the milk into which the culture is introduced is slightly too acid or is otherwise unsatisfactory in quality or flavor, because of the eating of improper food by the cows producing it, or for any other reason, the resulting product is watery, or bitter, and unfit for use. By the earlier process, whereby the culture was introduced directly into the entire bulk of milk to be fermented, such defect of quality in the milk resulted in the spoiling and loss of the entire mass. By my improved process, wherein the fermentation of the final bulk of milk is the result of three distinct steps, if any such defect exists in the milk that is employed in the process, this defect becomes apparent in the initial step of the fermentation in the small quantity of milk into which the culture is first introduced, or in the second step of the fermentation when this quantity is added to the next larger quantity employed. If at either of these earlier steps of the process the resulting product is unsatisfactory, the ferment can be discarded, and the process begun anew. Thus, all defective ferments are eliminated in the first or second step of the process and the final product has been found to be invariably of a uniform character and satisfactory quality, free from the defects that have heretofore developed in the process of manufacture. While the milk used in the three steps of my improved process is produced at different times, nevertheless, as milk distributors commonly derive their product from a constant source of supply, no variation from day to day has been found to develop, that will affect the uniformity of the final product.

Having now fully described my invention, what I claim as new and desire to protect by Letters Patent, is:

1. The improved process for the fermentation of milk by the use of the Bulgarian bacillus, wherein the culture is first introduced into a small quantity of milk which is allowed to ferment and is then added to a larger quantity of milk, the process of fermentation being allowed to repeat itself, and this fermented product is again added to a larger quantity of milk which is in turn allowed to ferment, the successive steps being repeated until the desired quantity of the fermented product has been obtained.

2. The improved process for the fermentation of milk, consisting of the following steps: the addition of a culture of Bulgarian bacillus to a small quantity of whole milk at a temperature of 90° F., in the proportion of about one ounce of the former to one quart of the latter, and the ferment of this mixture for a period of about twenty hours; the addition of this ferment at the end of about twenty hours to a larger quantity of whole milk at a temperature of 90° F., in the proportion of about one quart of the first ferment to three gallons of milk, and the maintenance of this mixture at a temperature of 90° F., for a period of twelve hours; the further addition of this second ferment to a larger quantity of whole milk at a temperature of 90° F., in the proportion of about three gallons of the former to one hundred gallons of the latter, and the maintenance of the mixture at a temperature of 90° F., for a further period of twelve hours, until the process of fermentation is complete.

In testimony whereof I have hereunto subscribed my name in the presence of two witnesses.

ARTHUR B. CLARK.

Witnesses:
 ARTHUR WM. BARBER,
 FANNIE E. TESCH.